United States Patent
Ito et al.

(10) Patent No.: US 7,474,849 B2
(45) Date of Patent: Jan. 6, 2009

(54) CAMERA HAVING POWER-SAVING MODE

(75) Inventors: Shingo Ito, Yokohama (JP); Masahiro Ueda, Hitachinaka (JP); Haruhiko Miyao, Mito (JP)

(73) Assignee: Hitachi, Ltd., Tokyo (JP)

( * ) Notice: Subject to any disclaimer, the term of this patent is extended or adjusted under 35 U.S.C. 154(b) by 278 days.

(21) Appl. No.: 11/513,362

(22) Filed: Aug. 31, 2006

(65) Prior Publication Data

US 2007/0122140 A1    May 31, 2007

(30) Foreign Application Priority Data

Nov. 30, 2005   (JP)   ............................. 2005-344876
Jun. 14, 2006   (JP)   ............................. 2006-164174

(51) Int. Cl.
G03B 7/26    (2006.01)
H04N 5/228   (2006.01)
H04N 5/222   (2006.01)
H04N 5/225   (2006.01)

(52) U.S. Cl. ....................... 396/301; 396/302; 396/303; 348/208.16; 348/333.13; 348/372

(58) Field of Classification Search ......... 396/301–303, 396/387, 390, 395; 348/81, 208.16, 333.13, 348/372; 700/12
See application file for complete search history.

(56) References Cited

U.S. PATENT DOCUMENTS

| | | | | |
|---|---|---|---|---|
| 6,600,876 B2 * | 7/2003 | Sato | ............................ | 396/55 |
| 2003/0149492 A1 * | 8/2003 | Munezane | ................... | 700/12 |
| 2003/0179314 A1 * | 9/2003 | Nozaki | ....................... | 348/375 |
| 2006/0018207 A1 * | 1/2006 | Saito | ....................... | 369/30.01 |

FOREIGN PATENT DOCUMENTS

| | | |
|---|---|---|
| JP | 58-018643 | 2/1983 |
| JP | 60-140287 | 9/1985 |
| JP | 62-170066 | 7/1987 |
| JP | 63-81382 | 5/1988 |
| JP | 63-164845 | 10/1988 |
| JP | 2-192089 | 7/1990 |
| JP | 2-254693 | 10/1990 |
| JP | 3-164926 | 7/1991 |
| JP | 3-186073 | 8/1991 |

(Continued)

OTHER PUBLICATIONS

Instruction Manual for Digital Video Camera "NV-Gs250" produced by Matsushita Electric Industry Co., p. 9 and p. 35, no date given. no translation into English.

*Primary Examiner*—Melissa J Koval
(74) *Attorney, Agent, or Firm*—Antonelli, Terry, Stout & Kraus, LLP.

(57) ABSTRACT

A video camera having a power-On recording standby mode, a power-On recording disabled mode, and a power-saving mode, in addition to power-OFF mode. The power-saving mode is a state in which the time taken to shift to said recording standby mode is shorter than the time taken to shift from power-OFF mode. Switching to the power-saving mode is inhibited when recording on the recording medium is not possible, thereby improving the operability of the video camera for the user. The user is prevented from attempting to record during power saving mode.

5 Claims, 5 Drawing Sheets

FOREIGN PATENT DOCUMENTS

| | | |
|---|---|---|
| JP | 3-188519 | 8/1991 |
| JP | 4-57251 | 2/1992 |
| JP | 4-222019 | 8/1992 |
| JP | 5-257574 | 10/1993 |
| JP | 07-056725 | 3/1995 |
| JP | 08-021189 | 1/1996 |
| JP | 8-335357 | 12/1996 |
| JP | 10-289557 | 10/1998 |
| JP | 11-88672 | 3/1999 |
| JP | 2000-152138 | 5/2000 |
| JP | 3093928 | 7/2000 |
| JP | 3096683 | 8/2000 |
| JP | 2001-223929 | 8/2001 |
| JP | 2001-223937 | 8/2001 |
| JP | 2001-257969 | 9/2001 |
| JP | 2001-275034 | 10/2001 |
| JP | 2001-313894 | 11/2001 |
| JP | 2002-25237 | 1/2002 |
| JP | 2002-86845 | 3/2002 |
| JP | 3288681 | 3/2002 |
| JP | 3293779 | 4/2002 |
| JP | 2002-247502 | 8/2002 |
| JP | 2003-32519 | 1/2003 |
| JP | 3397783 | 2/2003 |
| JP | 2003-77211 | 3/2003 |
| JP | 3411238 | 3/2003 |
| JP | 3478261 | 10/2003 |
| JP | 2003-331570 | 11/2003 |
| JP | 2004-13922 | 1/2004 |
| JP | 2004-310403 | 1/2004 |
| JP | 2004-72222 | 3/2004 |
| JP | 2004-96391 | 3/2004 |
| JP | 2004-152344 | 5/2004 |
| JP | 2004-187085 | 7/2004 |
| JP | 2004-295975 | 10/2004 |
| JP | 3627807 | 12/2004 |
| JP | 2005-072808 | 3/2005 |
| JP | 2005-267763 | 9/2005 |
| JP | 2005-310214 | 11/2005 |
| JP | 2006-033365 | 2/2006 |
| JP | 3792230 | 4/2006 |
| JP | 2006-164334 | 6/2006 |
| JP | 2006-196071 | 7/2006 |
| JP | 2006-314015 | 11/2006 |
| WO | WO 2005/071675 | 4/2005 |

* cited by examiner

Side face of a video camera

(b)

Rear face of the video camera (c)

Top face of the video camera

CAMERA HAVING POWER-SAVING MODE

CLAIM OF PRIORITY

The present application claims priority from Japanese application P2005-344876 filed on Nov. 30, 2005 and P2006-164174 filed on Jun. 14, 2006, the contents of which are hereby incorporated by reference into this application.

BACKGROUND OF THE INVENTION

The present invention relates to a camera. More specifically this invention relates to a camera having power-saving mode.

Recently cameras such as video cameras or digital still cameras have a plurality of photographing modes so that both moving pictures and still images can be taken with a unit of camera. Such cameras have become more and more versatile and compatible with plurality types of recording media.

There is also the tendency that a screen size of a display device such as a liquid crystal display used for photographing images or replaying the photographed images has become increasingly larger for improving the user friendliness including easiness in use. Generally the display devices as described above display images not only during shooting but also in other operation modes, and therefore consume power even when the display devices are not being used for shooting.

When a camera with a battery incorporated therein is used for a long time, attention should be paid to power saving. For instance, it is necessary to turn off power when a camera is not used for shooting nor for setting. When power supply is switched from OFF to ON for shooting, a certain period of time is required until operations for shooting and recording are enabled, because it is necessary to perform several preparatory operations for enabling shooting and recording such as adjustment of an optical recording medium for read/write operations, checking of a capacity, and setting of a focus of the camera system. Therefore, when power supply is switched from OFF to ON, such operations as shooting and recording cannot be started immediately, and a photo opportunity may be lost. Cameras represented by video cameras and digital still cameras are always required to be kept in the state where shooting and recording can immediately be started, but if the power is always kept ON, the battery will be consumed soon, and in that case the camera cannot be used for a long period of time.

In the conventional technology, to solve the problems as described above, a drive unit required for recording is operated to assume the stand-by mode only when shooting is enabled by turning ON power for a video camera and setting the operation mode in the shooting mode for enabling shooting. In other words, when power is turned on, the drive unit is kept in the power-saving mode to suppress power consumption (Refer to Patent Document 1).

Other examples of conventional technology have a dedicated key (quick start key) for switching an operation mode of a video camera from the shooting mode, in which power is ON to the power-saving mode in which power consumption is suppressed as compared to that in the ordinary power ON state because displays on a liquid crystal display, a view finder and the like are not provided, and with this dedicated key shift to and from the power-saving mode can be performed. Furthermore, in the power-saving mode, the fact that the current operation mode is the power-saving mode is indicated by a light emitting device, so that a user can visually identify the current operation mode. Because of the configuration, when the operation mode is switched from the power-saving mode to the previous shooting mode in which power is turned on, a required operation can be started more quickly as compared to a case when the power OFF state is switched to the power ON state, which enables shortening of the time required until shooting is started. Video cameras having the quick start key have been put into the market (Refer to, for instance, Non-patent Document 1).

Patent document 2 includes the description of "With a power-saving switch 26 provided in a digital still camera, a user of the digital still camera can effect or release the power-saving mode according to the necessity. Furthermore the user can determine whether the current operation mode is the power-saving mode or not by visually checking a display state of the LED 21" (Abstract).

[Patent Document 1]
  Japanese Patent Laid-Open No. 2001-223929

[Patent Document 2]
  Japanese Patent Laid-Open No. 2005-72808

[Non-patent Document 1]
  Instruction Manual for Digital Video Camera "NV-GS250" produced by Matsushita Electric Industry Co., page 9, page 35.

SUMMARY OF THE INVENTION

In the conventional technology disclosed in Patent Document 1 above, the drive unit does not operate ordinarily when power is ON. More specifically, the drive unit is set in the stand-by state only after the operation mode is set in the shooting mode to operate the drive unit and adjustment for read/write operations to and from an optical recording device or checking of the capacity is performed. Because of the configuration described above, it takes much time for the adjustment for read/write operations to and from the optical recording medium or for checking of the capacity, and therefore there still disadvantageously remains the possibility of losing a photo opportunity.

In the conventional technology disclosed in Non-patent document 1 above or in Patent document 2, there is no consideration to recognition of a state of a recording medium. Because of the configuration, the power-saving mode is assumed even when the recording medium is in the recording-disabled state, which disadvantageously causes misunderstanding by a user that recording may be performed immediately. Furthermore, when the operation mode is changed to that different from the operation before shifting to the power-saving mode such as taking out a recording medium in the power-saving mode or switching to the shooting mode, if the power-saving mode is cancelled and the ordinary power ON state is restored, then the display is kept in that for the power-saving mode. In this case, the user may misunderstand that shooting is possible even when the operation mode is in the shooting-disabled state.

To solve the problems as described above, the present invention provides a camera having the power-saving mode in which it takes a short period of time until start of shooting (recording) and switching to the power-saving mode is inhibited when recording in the recording medium is not possible to thereby prevent the user's misunderstanding.

With the camera as described above, for instance, by using the unit described above, the operability for the user making use of the power-saving mode is improved. Other problems, units, and effects will be clarified in the embodiments described below.

DESCRIPTION OF THE PREFERRED EMBODIMENTS

Embodiments of the present invention will be described below with reference to the drawing.

First Embodiment

A configuration of an external appearance of a video camera according to a first embodiment of the present invention will be described below with reference to FIGS. 1A to 1C. FIGS. 1A to 1C are external views illustrating the video camera according to the first embodiment. FIG. 1A is a view illustrating a side face of the video camera, FIG. 1B is a view illustrating a rear face of the video camera, and FIG. 1C is a top view illustrating the camera.

The video camera according to the first embodiment of the present invention includes a lens 1 directed toward an object of shooting, a view finder 2 for displaying a photographed image or various types of information, a liquid crystal display device 3, a battery 4 for supplying power, various operating keys 5 used for operating the video camera, an Eject key 6 used for taking out a recording medium, a moving picture shooting key 7 used for shooting (recording) a moving picture, a power/shooting mode switching key 8 used for turning ON/OFF or switching to the shooting mode, a still image shooting key 9 used for shooting (recording a still image, a zoom key 10, a power-saving key 11 for shifting to and from the power-saving mode, and an LED (light emitting diode) 12 which is lit when the power-saving mode is assumed. The liquid crystal display device 3 may be other type of display such as an electroluminescence.

Figure 2:
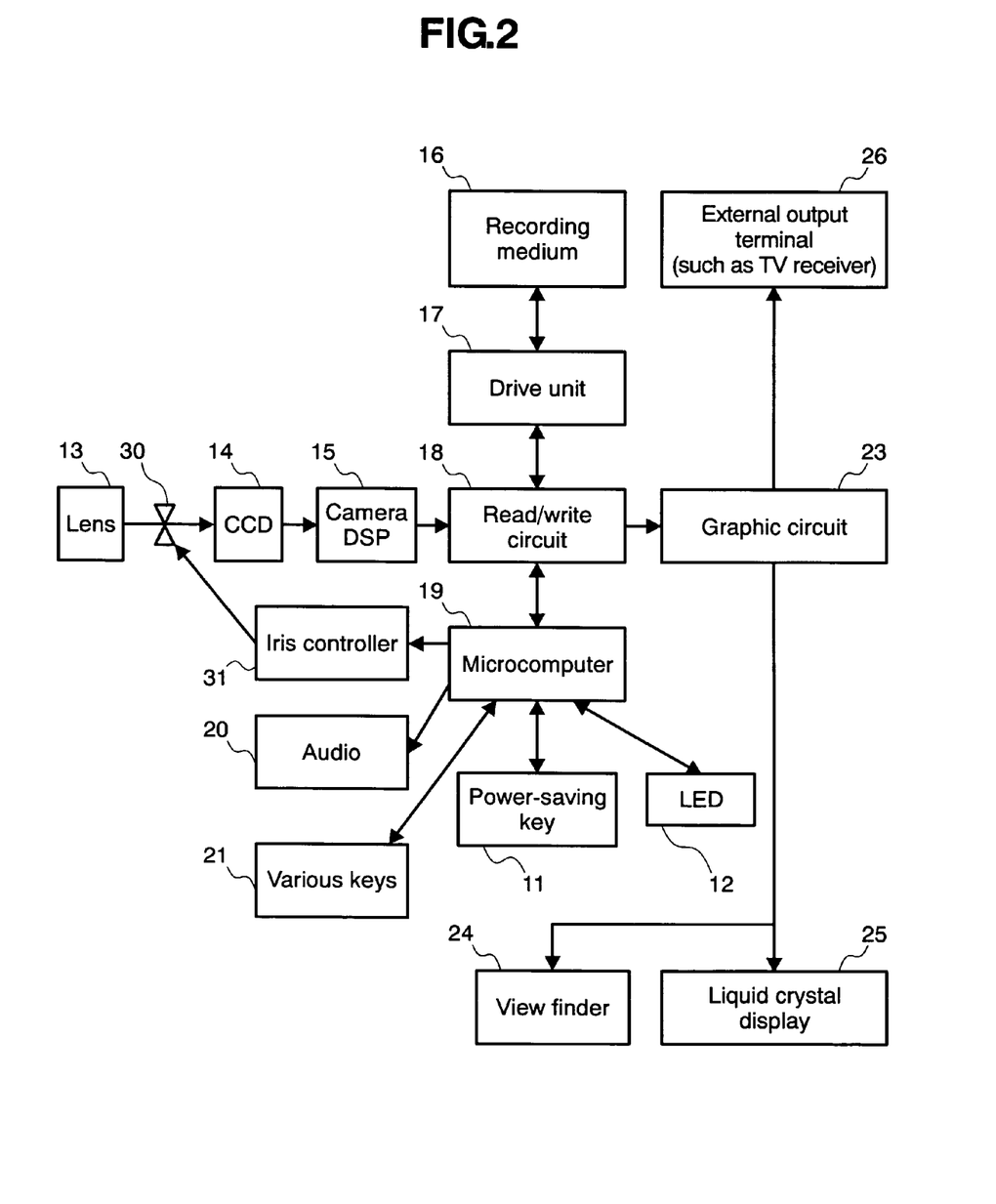
FIG. 2 is a block diagram illustrating an internal configuration of the video camera according to the embodiment.

An internal configuration and general operations of the video camera will be described below with reference to FIG. 2. FIG. 2 is a block diagram illustrating an internal configuration of the video camera according to the embodiment.

The video camera includes a lens 13, a CCD (Charge Coupled Device) 14, a camera DSP (Digital Signal Processor) 15, a recording medium 16, a drive unit 17, a read/write circuit 18, a microcomputer 19, an audio 20, an input key 21, a power-saving key 11, an LED 12, a graphic circuit 23, view finder 24, a liquid crystal display 25, and an external output terminal 26. The input key 21 includes the various operating keys 5, the eject key 6, the moving picture shooting key 7, the power/shooting mode switching key 8, the still image shooting key 9, and the zoom key 10. The CCD may be other type of imaging device such as CMOS (Complementary Metal Oxide Semiconductor).

In recording, an image of an object of shooting acquired from the lens 13 is converted by the CCD 14 to a video signal and the resulting signal is further subjected to processing such as encoding by the read/write circuit 18 before being recorded in the recording medium 16 such as an optical disk by the drive unit 17. On the other hand, the video signal input into the read/write circuit 18 is subjected to processing for superposing character information or the like in the graphic circuit 23 such that it is displayed on the view finder 24 or on the liquid crystal display 25, and also is displayed on a display device (such as a TV receiver) connected to the external output terminal 26.

In reproduction, the video signal reproduced via the drive unit 17 from the recording medium 16 is subjected to decoding or the like in the rear/write circuit 18. The resulting signal is then subjected to processing for superposing character information or the like in the graphic circuit 23 such that it is displayed on the view finder 24 or the liquid crystal display 25, and is also displayed on a display device (such as a TV receiver) connected to the external output terminal 26.

The microcomputer 19 is a control device for controlling the video camera as a whole, and controls each block according to input from the input key 21 or from the power-saving key 11. The audio 20 performs analog to digital conversion or digital to analog conversion of an audio signal.

An iris 30 is a mechanism for adjusting a volume of light passing through a lens in response to change in a form of a diaphragm in the lens.

The power-saving mode in the present embodiment will be described below.

When the operation mode is switched to the shooting mode by operating the power/shooting mode switching key 8, power is turned on and the microcomputer 19 controls each block to execute adjustment for read/write operations to and from the recording medium 16 and to check a state of the recording medium 16 such as its capacity. Further, the microcomputer 19 controls the lens to set various functions of the video camera such as focusing conditions. Also whether recording to the recording medium is possible or not is checked. When recording is possible, the video camera assumes the power ON recording stand-by state and stands by until the user operates the moving picture shooting key 7 or the still image shooting key 9. In this step, a message indicating that recording is possible may be displayed together with an image of an object of shooting on the view finder 24 or on the liquid crystal display 25. When the user presses the moving picture shooting key 7 or the still image shooting key 9, recording is started. When recording is not possible, the video camera assumes the power ON recording disabled state. In this state, the a message indicating that recording is not possible may be displayed together with an image of an object of shooting on the view finder 24 or on the liquid crystal display 25. Since, in the power ON recording disabled state, circuit blocks involved in shooting or recording are still operating, the time it takes until recording is started is short.

When the power-saving key 11 is pressed in the power ON recording stand-by state, the video camera assumes the power-saving mode with the LED 12 lit. When the power-saving key 11 is pressed in the power ON recording disabled state, the message indicating that recording is not possible is displayed together with an image of an object of shooting on the view finder 24 or on the liquid crystal display 25. As described above, when recording into the recording medium 16 is not possible, switching to the power-saving mode is inhibited, and therefore the LED 12 is not lit. Because of this configuration, user's miss understanding that recording is possible is prevented.

When the recording medium 16 is taken out in the power-saving mode, the microcomputer 19 having detected via the drive unit 17 that the recording medium 16 had been taken out cancels the power-saving mode, setting the power ON recording disabled state. When the shooting mode is changed to any other operation mode by pressing the power/shooting mode switching key 8 in the power-saving mode, at first whether recording is possible or not is determined in the shooting mode after the power-saving mode has been canceled and switched. As a result, if it is determined that recording is possible, then the video camera assumes the power ON recording standby state and stands by until the user presses the moving picture shooting key 7 or the sill image shooting key 9.

In this power-saving state, when the power-saving state of such components as the lens 13, the CCD 14, the camera DSP 15, the drive unit 17, the audio 20, the graphic circuit 23, the view finder 24, the liquid crystal display 25, and the external output 26 is cancelled, such circuit blocks as it takes a shorter period of time to assume a power ON recording standby state is operated, while the operation of other circuit blocks is stopped and shifted to the power-saving mode. For instance, display screens of the view finder 24 and the liquid crystal display 25 are turned off to achieve the power-saving effect, while the lens 13 is moved to a position where the lens 13 can quickly be started and then operations of the drive circuit blocks are stopped. The CCD 14, the camera DSP 15, the drive unit 17, the audio 20, and circuit blocks such as the graphic circuit 23 and the external output 26 are set in the power-saving standby state. The iris 30 is generally set in the fully closed state when the operation is stopped (in the no load state), the microcomputer 19 provides controls so that the iris 30 is fully closed via an iris controller 31 in the power saving mode. Further, the microcomputer 19 stores a control value for the iris 30 immediately before the power saving mode is assumed.

When the power-saving mode is not prepared, the operation mode may be set in the state where a power consumption rate is low and at the same time the operation can quickly be started. For instance, when power consumption of a circuit block is low not in the recording standby state but in the video reproducing state, the circuit block should be set in the reproducing state to suppress power consumption.

Figure 3:
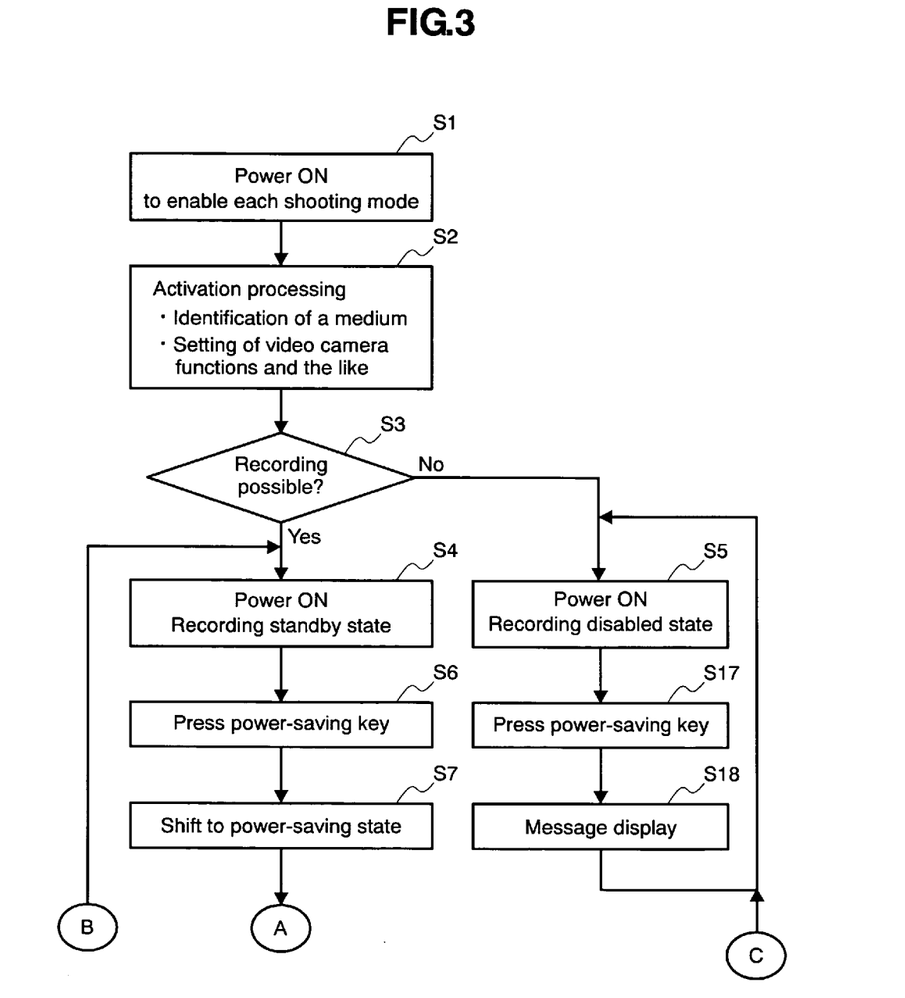
FIG. 3 is a flow chart illustrating a processing procedure for shifting the operation mode of the video camera according to the embodiment to the power-saving mode.
Figure 4:
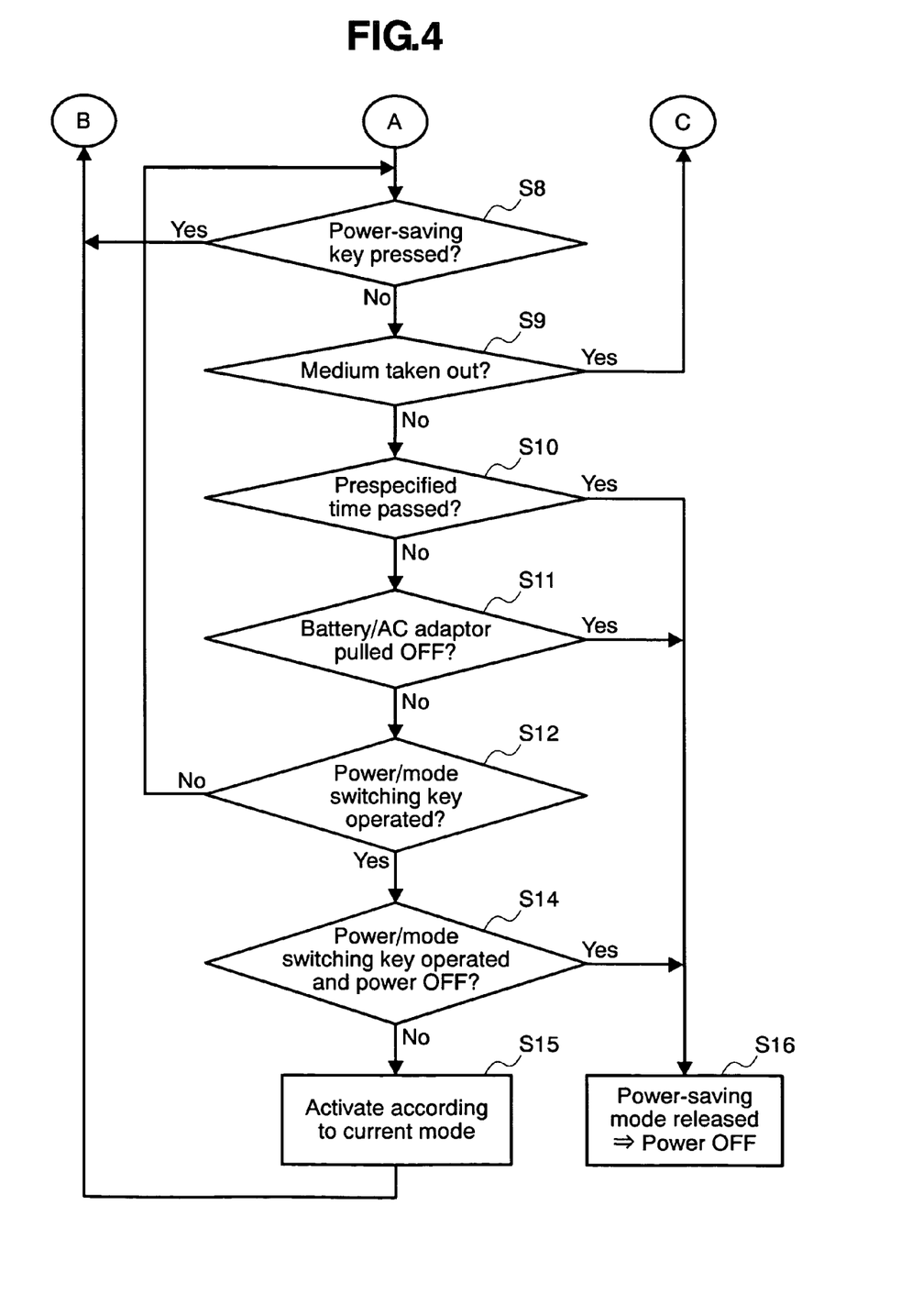
FIG. 4 is a flow chart illustrating a processing procedure when the video camera according to the embodiment is in the power-saving mode.

Processing flows in the video camera according to the present embodiment when shifting to the power-saving mode and in the power-saving mode will be described with reference to FIG. 3 and FIG. 4. FIG. 3 is a flow chart illustrating operations for shifting to the power-saving state in the video camera according to the present embodiment. FIG. 4 is a flow chart illustrating operations in the power-saving mode of the video camera according to the present embodiment.

In this embodiment, when the power-saving key 11 is pressed, the operation mode of the video camera is shifted to the power-saving mode, and when the power-saving key 11 is pressed again, the power-saving mode is cancelled and the power ON recording standby state, in which recording can immediately be started, is assumed. Because of the configuration, the time it takes until recording is started can be shortened to achieve the power-saving effect. The operation flow will be described in details below.

When an operation for switching to the shooting mode is performed by pressing the power/shooting mode switching key 8 in step S1, power is turned on, and the video camera is started-up in step S2. The term of shooting mode as used herein indicates the moving picture shooting mode for shooting a moving picture or the still image shooting mode for shooting a still image. In step S2 in which the video camera is started-up, preparatory operations for shooting are preformed by adjusting for read/write operations to and from the recording medium 16 (referred to as medium hereinafter), checking a state of the recording medium 16 such as its capacity, or by setting various functions of the video camera (for instance, by controlling the lens 13 to set a focus). Further, in step S2 whether recording into the recording medium 16 is possible or not is determined. In step S3, whether recording in the shooting mode selected for the recording medium 16 as a result of processing in step S2 is possible is determined. When it is determined that recording is possible, the operation mode of the video camera is shifted to a state in step S4 where power is ON and recording is enabled (referred to as recording standby state below) and the video camera stands by until the user presses the moving picture shooting key 7 or the sill image shooting key 9. When the user presses the moving picture shooting key 7 or the sill image shooting key 9, recording is started. Since recording is started from the recording standby state, recording can be started within a short period of time.

The expression of the recording-enabled state or the recording standby state as used herein indicates the states as described below: the recording medium 16 has been inserted into the video camera and a remaining capacity of the medium 16 is still available for recording images; the recordable shooting mode has been selected for the inserted recording medium 16; a capacity of the battery 4 is sufficient; and images may be recorded by pressing the moving picture shooting key 7 or the sill image shooting key 9.

When it is determined in step S3 that recording with the video camera is not possible because it is determined in step 2 that a capacity of the recording medium 16 is not available for recording images, that the recording medium has not been inserted, that a capacity of the battery 4 is not sufficient, or the like, shooting in step S5 cannot be performed. In this case the operation mode of the video camera is shifted to the power ON state (referred to as the recording disabled state).

In the recording standby state effected in step S4, when the power-saving key 11 is pressed in step S6, the operation mode of the video camera is shifted to the power-saving mode in step 7. In this step, the LED 12 is lit to indicate that the video camera is in the power-saving mode. Since, in the power-saving mode, a display screen of the view finder 24 or the liquid crystal display 25 is OFF, the LED 12 is lit to prevent user's misunderstanding that power is OFF.

When the power-saving key 11 is pressed in step S17 in the recording disabled state effected in step S5, a message is displayed on the view finder 24 or on the liquid crystal display 25 in step S18 that recording is not possible, and the operation mode of the video camera returns to the recording disabled state effected in step S5. Because the power-saving key 11 is enabled only in the recording enabled state effected in step S4, the recording enabled state is always restored whenever the power-saving state is cancelled. When the power-saving key 11 is pressed in the recording disabled state effected in step S5, the reason why the operation mode cannot be shifted to the power-saving mode is displayed to alert the user that the video camera cannot be used for shooting, and therefore the user's misunderstanding can be prevented.

A processing flow after switching to the power-saving mode will be described below with reference to FIG. 4. In the power-saving mode, an operating state of the video camera is checked in step S8, step S9, step S10, step S11, and step S12 according to the necessity.

After switched to the power-saving mode in step S7 of FIG. 3, when it is determined in step S8 that the power-saving key 11 has been pressed again, the power-saving mode is cancelled and the operating state of the video camera returns to the recording standby state effected in step S4. In this step, an operating state of the video camera is directly shifted to the recording standby state without performing checking of an operating state of the recording medium 16 or other operations for setting various functions of the video camera as performed in the ordinary starting step. Therefore recording can be started immediately, which prevents a user from losing a photo opportunity.

In other words, for instance, when the operation returns the recording standby state, the view finder 24 with the display screen turned off and the display screen of the liquid crystal display 25 are turned on, operations for focusing the lens 13 are performed, and the circuit blocks such as the CCD 4, the camera DSP 15, the drive unit 17, the audio 20, the graphic circuit 23, and the external output terminal 26 are turned on.

When an image is displayed more quickly on the view finder 24 and the liquid crystal display 25, the user can quickly adjust an angle of view to an object for shooting. More specifically, for instance, immediately after the power-saving mode is released, the microcomputer 19 sets the iris 30 in the first open state via the iris controller 31. This first state is effected first, and then a volume of light (an incoming light volume) is adjusted for shooting.

The first state may be defined according to the conditions expected for shooting, and there is no specific restriction on the state. For instance, an operation for fully opening the iris 30 is effective at a dark place where the iris is relatively opened. Also an operation for fully closing the iris 30 is effective at a bright place where the iris is relatively closed. An operation for setting the iris 30 in the intermediate state provides compatibility to various degrees of brightness.

In the first state, the control value for the iris 30 just before shift to the power-saving mode stored in the microcomputer 19 may be used. In this case, an operation for setting the iris 30 in the state specified by the control value or in any other state specified by a value close to the control value (such as fully opened state, fully close state, or intermediate state) is effective, for instance, when a site for shooting does not change. The control value is not limited to any numerical value, and a level or the like may be used for the purpose. The control value may be stored in the microcomputer 19 or in a memory provided separately, which is generically referred to as "exposure state storing unit". A position of the iris 30 itself may be retained at a place where the power-saving mode is assumed, but damage may be caused to the imaging device or other components, and therefore preferably the control value is stored and the iris 30 is controlled according to the stored control value.

On the other hand, in the normal start-up (by turning on the power from off), the iris 30 is gradually opened from a second state where the iris 30 is more closed than in the first state by and by to adjust a volume of incoming light to a value suited to the shooting site. As described above, control of the iris 30 is switched between the start-up from the power-OFF state and the start-up from the power-saving mode.

Exposure control is not limited to control of the iris 30. An exposure rate can be increased, for instance, by slowing a shutter speed (exposure time per field (e.g., 1/60 sec) in an imaging device (CCD 14). Furthermore the exposure can be increased by making a gain larger with the automatic gain control (AGC) of the camera DSP 15. Also in the control mode as described above, an exposure rate is switched between the normal state-up and the start-up from the power-saving mode with the microcomputer 19 or with a control or a driver not shown. In this case, like in control for the iris 30, a configuration is allowable in which adjustment is started from a prespecified value (such as a maximum value, a minimum value, or an intermediate value) in the power-saving mode, or in which a value when the operation mode has shifted to the power-saving mode is stored in the exposure state storing unit and a control value is adjusted based on the stored value.

By employing any of the control methods, or by switching an exposure rate between the normal start-up and start-up from the power-saving mode in combination with control for the iris 30, when starting-up from the power-saving mode, the user can advantageously adjust an angle of view more quickly. Especially, for instance, by slowing a shutter speed, even when the iris 30 is opened a little, a desired exposure rate can be obtained. The same effect can be obtained also by making the gain larger. Because the operations of the iris 30 are mechanical, when the operation of the iris 30 is slower in response at adjustment of an exposure rate as compared to the CCD or the AGC, employment of any or a combination of the control methods described above is effective.

When it is determined in step S9 that the eject key 6 has been pressed, the power-saving mode is cancelled with a media cover (not shown) opened, and the medium 16 is taken out. When the recording medium 16 is not present, or when the media cover is kept open, an operating state of the video camera returned to step S5 with recording disabled.

When it is determined in step S10 that a prespecified period of time has passed in the power-saving mode, the power-saving mode of the video camera is cancelled and power for the video camera itself is turned off in step S16. The power-saving mode apparently looks like the power OFF state, but unlike in the power OFF state, power is consumed although the power consumption rate is substantially low as compared to that in the ordinary power ON state. By automatically turning off power for the video camera, the power-saving mode is cancelled within a prespecified period of time to prolong lifetime of a battery. It should be noted that the period may be set by a user, or may be set to a fixed value such as 30 minutes beforehand. This means that, when power is turned on thereafter, the operation of the video camera is not started from the power-saving state, and accordingly the ordinary starting-up operation is performed.

When it is determined in step S11 that the battery 4 or an AC adaptor (not show) has been pulled off, the power-saving mode of the video camera is cancelled, and power is turned off in step S16. This means that, when power is turned on thereafter, the operation of the video camera is not started from the power-saving state, and accordingly the ordinary starting-up operation is performed.

When it is determined in step S12 that power has been turned off or the shooting mode has been changed by pressing the power/shooting mode switching key 8, the operating state of the video camera selected by pressing the power/shooting mode switching key 8 is determined in step S14. It is assumed that the shooting mode has been changed. More specifically, if the shooting mode has been changed from the moving picture shooting mode effected before the power-saving mode to the still image shooting mode, or from the still image shooting mode effected before the power-saving mode to the moving picture shooting mode (No in step S14), then the power saving mode is cancelled, the video camera is started-up in step S15 according to the shooting mode changed, and then the operating state of the video camera returns to step S4 and is set in the standby state. When power is turned off (Yes in step S14), power for the video camera is turned off in step S16.

When the shooting mode is changed in step S15, since it is necessary to check whether recording is possible or not in the shooting mode changed, states of the video camera and the medium 16 are checked during the operation for activating the video camera. When the shooting mode is changed to a mode in which a smaller capacity is used as compared to that required for shooting a moving picture, namely when the shooting mode is changed from the moving image shooting mode to the still image shooting mode, if shift to the recording enabled state is insured, then the operation for activation described above may be omitted.

The processing flow for shifting the operating state of the video camera to the power-saving state and the power-saving mode of the video camera has been described above with reference to the process flow in the power-saving state shown in FIG. 3 and FIG. 4. As described above, by providing the power-saving mode enabling immediate shift to the recording standby state, a period of time it takes to start recording can be shortened while saving power. Further, the power-saving mode is not assumed when recording is not possible, which makes it possible to prevent user's misunderstanding that recording is possible.

Figure 5:
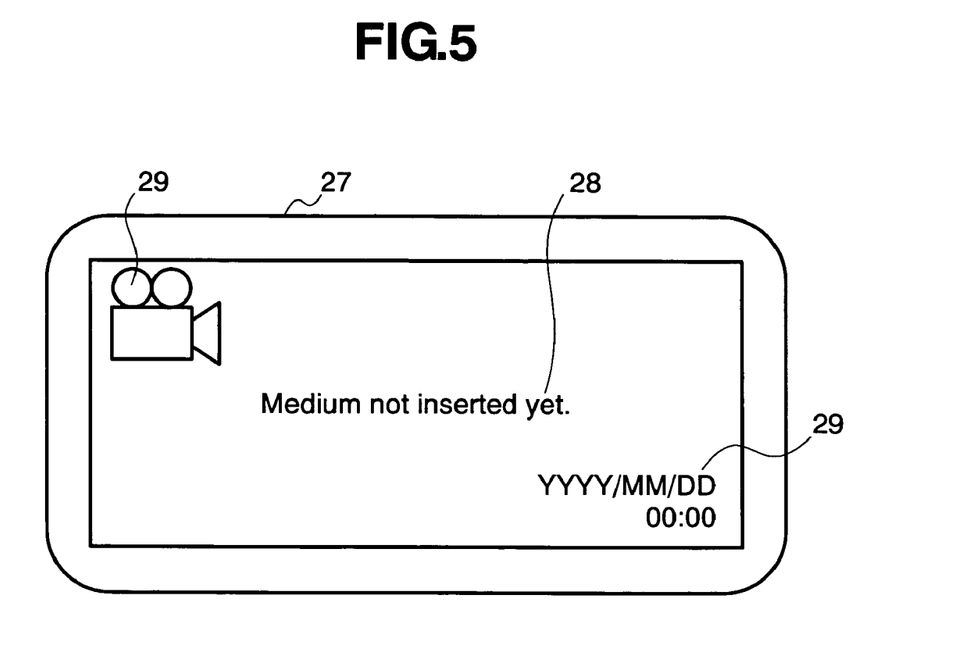
FIG. 5 is a view illustrating an example of a screen showing a message display in the video camera according to the present invention.

An example of display to be implemented in step S18 will be described with reference to FIG. 5. FIG. 5 is a view illustrating an example of a screen for displaying a message in the video camera according to the present embodiment.

Displayed on the liquid crystal display screen 27 are a message 28 indicating that recording is not possible and other displays 29 including a shooting mode and a date. The message indicates that the recording-medium 16 has not been inserted and recording is not possible. The message 26 reads "A medium is not inserted yet". When recording is disabled for any other cause, a message for the cause is displayed.

Figure 1:
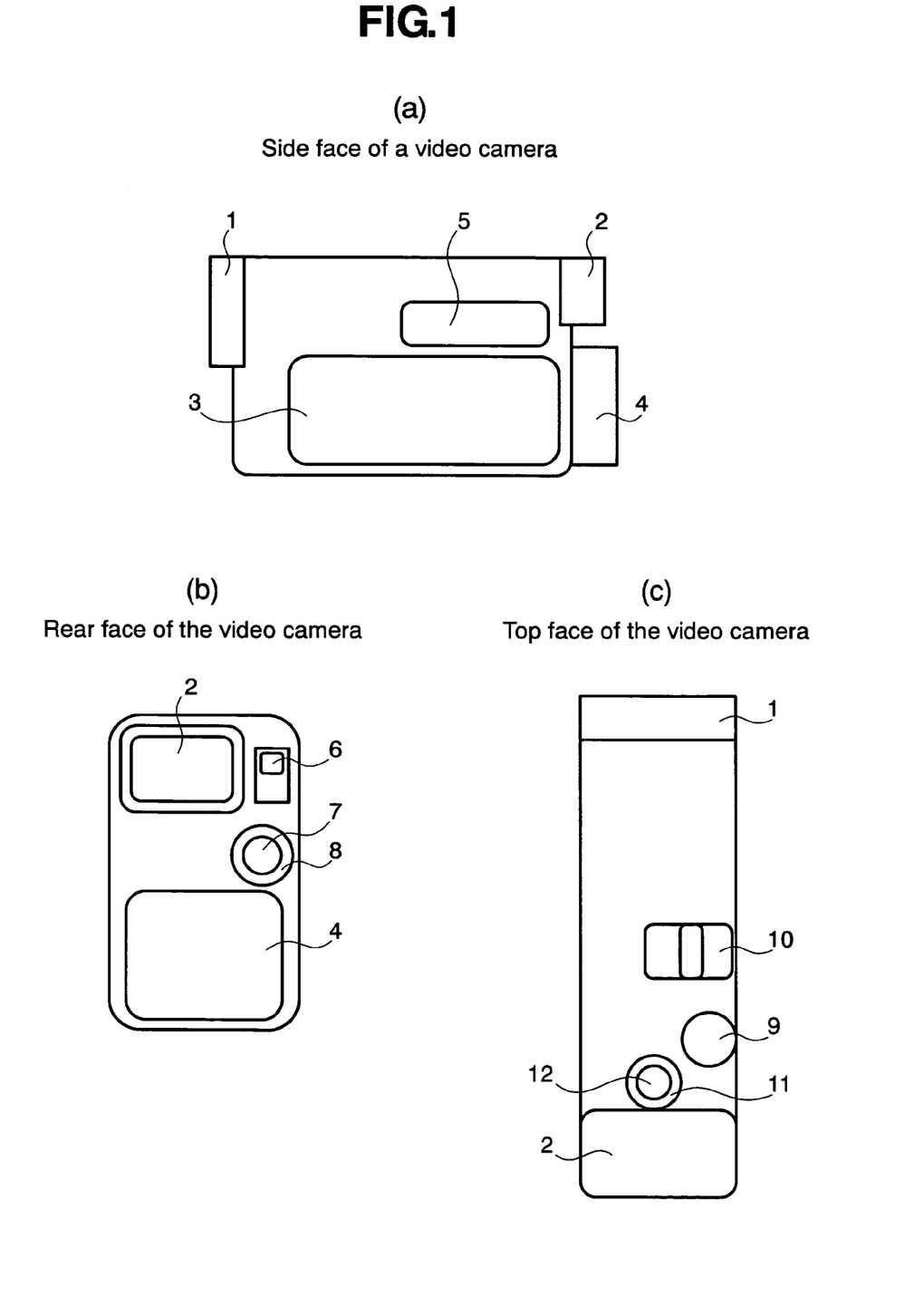
FIG. 1 is an external view illustrating a video camera according to an embodiment of the present invention.

Types and arrangement of the keys and the battery in the video camera described in the first embodiment above and shown in FIG. 1 are exemplary, and the present invention is not limited to display content nor to the arrangement.

The processing flows for shifting to the power-saving state, the power-saving mode, and operations in the power-saving mode shown in FIG. 3 and FIG. 4 are exemplary, and the present invention will not be limited to content to be processed. It is needless to say that other operations may be added, and there is no specific restriction for power saving in the camera according to the present invention.

What is claimed is:

1. An imaging apparatus comprising:
   a camera unit to shoot an object of shooting and convert the image data obtained into an image signal;
   a recording unit to record the image data on a recording medium; and
   a control unit to control at least said camera unit and said recording unit,
   wherein:
   power-ON recording standby mode, power-ON recording disabled mode, and power-saving mode are provided when power is ON, in addition to power-OFF mode;
   said power-saving mode is a state in which the time taken to shift to said recording standby mode is shorter than the time taken to shift from said power-OFF mode;
   it is possible to shift from said power-ON mode to said power-saving mode while power is ON and when recording on said recording medium is possible; and
   when recording on said recording medium is not possible, it is inhibited to shift from said power-ON recording disabled mode to said power-saving mode.

2. The imaging apparatus as claimed in claim 1, wherein a dedicated key for switching to said power-saving mode is provided.

3. The imaging apparatus as claimed in claim 2, wherein a display unit is blanked out in said power-saving mode.

4. The imaging apparatus as claimed in claim 1, wherein a display unit is blanked out in said power-saving mode.

5. The imaging apparatus as claimed in claim 1, wherein:
   it is possible to shift from said power-ON mode to said power-saving mode while power is ON, when a remaining capacity of said recording medium is available and recording on said recording medium is possible; and
   when a remaining capacity of said recording medium is not available and recording on said recording medium is not possible, shifting from said power-ON recording disabled mode to said power-saving mode is inhibited.

\* \* \* \* \*